UNITED STATES PATENT OFFICE.

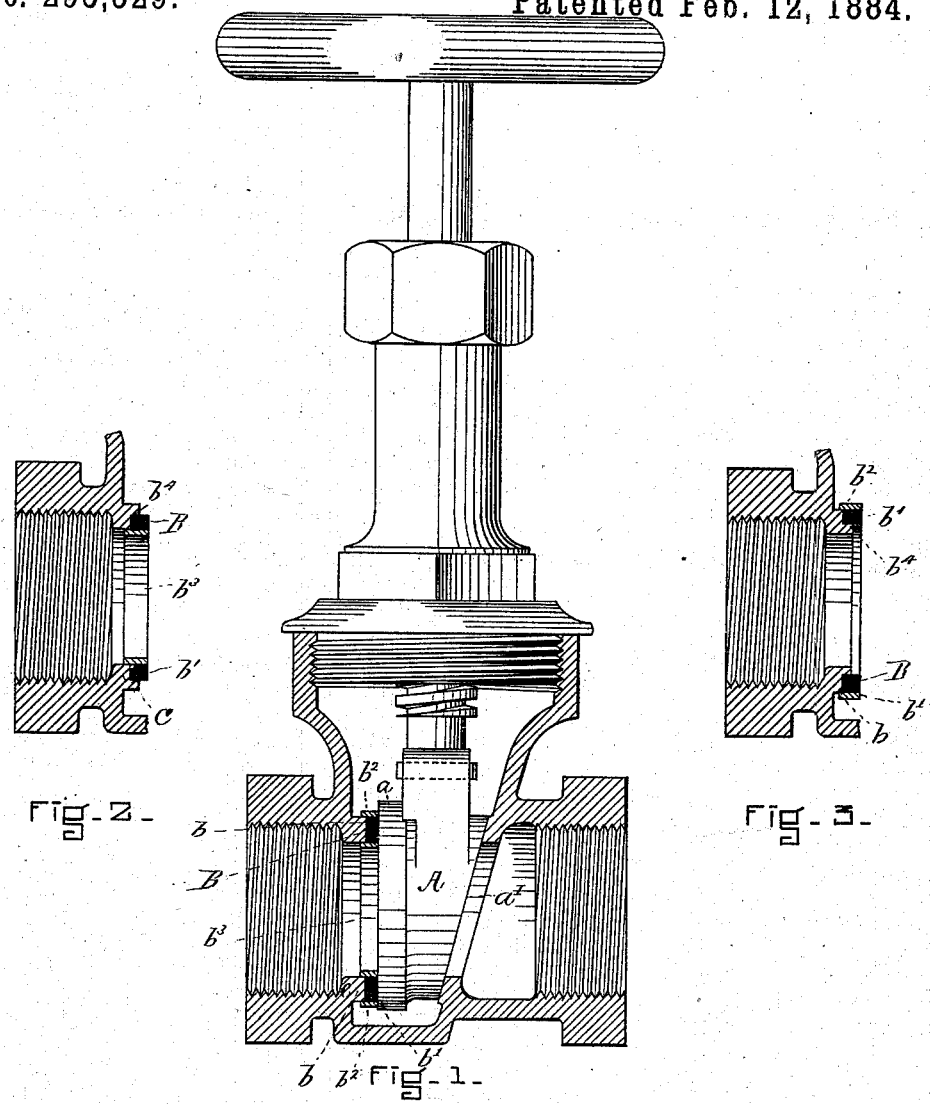

CHARLES JENKINS, OF BOSTON, MASSACHUSETTS.

VALVE.

SPECIFICATION forming part of Letters Patent No. 293,329, dated February 12, 1884.

Application filed February 17, 1883. (No model.)

*To all whom it may concern:*

Be it known that I, CHARLES JENKINS, of Boston, in the county of Suffolk and State of Massachusetts, a citizen of the United States, have invented a certain new and useful Improvement in Valves, of which the following is a full, clear, and exact description, reference being had to the accompanying drawings, forming a part of this specification, in explaining its nature, in which—

Figure 1 is a vertical central section of a valve containing my invention. Figs. 2 and 3 are detail views, representing modifications in construction. Fig. 4 represents in vertical section a detail of the construction, hereinafter referred to.

The object of the invention is to secure a packing resilient at steam temperatures to the valve-seat in such a manner as to protect it from abrasion or the direct action of the steam.

In the drawings, the invention is illustrated as applied to a straight-way valve. Referring thereto, A represents the valve or gate. It has the seating portion $a$ and the inclined portion $a'$, and is operated substantially as described in my Letters Patent No. 242,133. The valve-seat B has the raised circular portion or rest $b$, for supporting the packing $b'$, and the packing is held thereto by the outer slip-ring, $b^2$, and the inner slip-ring, $b^3$, the inner ring being extended against the surface of the rest and against the packing sufficiently to hold it in place, but not sufficiently to prevent it being moved as the packing wears; and the outer ring is contracted upon the packing sufficiently to hold it in place until moved by the wearing of the packing.

Of course, I may use one slip-ring only, if desired; but I prefer to employ two when this construction is used; and in order to insert the slip-rings and packing in place, I either build out from the wall of the valve the lower portion, $c$, of the diaphragm, or make a sufficient recess in the valve-body as will enable the slip-ring and packing to be properly and easily applied.

In lieu of the construction above described, I may use the construction shown in Fig. 4, in which case only one slip-ring is employed, the packing-holding support or diaphragm furnishing a wall, $b^4$, which acts in connection with the slip-ring, holding the packing in place; but the packing must project beyond the wall, as represented.

I prefer to use as a packing the "Jenkins patent packing," so called, but may use any other equivalent packing which becomes resilient or softened at steam temperatures.

In order to prevent the inner ring from being blown out of place by the steam-pressure, it may be necessary to form a recess, $b^5$, upon the inner surface of the packing support or diaphragm, so that the end of the inner slip-ring shall be protected or shielded from the direct action of the steam. This method of securing a disk of packing in a valve-seat, or to form a valve-seat, may be used for globe valves as well as for straight-way.

It will be observed that the slip ring or rings I have described form a movable connection or coupling for securing and holding the packing to the rest.

Having thus fully described my invention, I claim and desire to secure by Letters Patent of the United States—

1. The combination, in a valve having the rest $b$, of the packing $b'$, with the movable connection or coupling described, for holding and securing the packing to the rest, all substantially as and for the purposes set forth.

2. The combination in a valve having the rest $b$, of the packing $b'$ and the movable connection or coupling described, for holding and securing the packing to the rest, and the gate A, all substantially as and for the purposes described.

CHARLES JENKINS.

Witnesses:
 BOWDOIN S. PARKER,
 F. F. RAYMOND, 2d.